3,060,245
POLYMERIZATION INHIBITOR
Gene L. Wofford, Texas City, Tex., assignor to Monsanto Chemical Company, St. Louis, Mo., a corporation of Delaware
No Drawing. Filed Jan. 3, 1961, Ser. No. 79,999
2 Claims. (Cl. 260—652.5)

The present invention relates to the stabilization of chloroprene.

It is well known that chloroprene will polymerize upon standing at room temperature or generally when exposed to heat and/or light. This characteristic proves to be particularly troublesome in processes for manufacturing and/or purifying chloroprene. Difficulty has been experienced, for example, in the production of chloroprene by heating 3,4-dichlorobutene-1 with aqueous solutions of an alkali. In the operation of such a process on a continuous scale, polymeric and resinous materials are formed which rapidly plug up the apparatus. The polymeric material, which has a rubbery texture, is difficult to remove because of its insolubility in solvents and consequently its removal often necessitates a plant shutdown. Likewise, in purification processes wherein impure chloroprene is being distilled, polymerization is particularly likely to occur and in addition to creating the foregoing problems, results as well in reduced yields of chloroprene. Also, in other processes in which chloroprene is present as an impurity, it gives rise to these same problems. For example, when dichloroethane is pyrolyzed to produce vinyl chloride, small amounts of chloroprene occur as a by-product. Economical operation demands recycle of the unconverted dichloroethane and because of the temperatures employed this leads to formation of chloroprene polymers in various parts of the equipment which results in mechanical difficulties in the process. Storage and shipment of chloroprene, too, have presented difficult problems because of this tendency toward polymerization under normal storage and shipping conditions.

It is, therefore, an object of the present invention to provide new stabilizers or inhibitors of polymerization for chloroprene. Another object and advantage of the invention is to provide compositions comprising chloroprene stabilized against polymerization for storage and shipping purposes. Still another object of the invention is to provide a method for inhibiting the polymerization of chloroprene when it is subjected to heat and/or light.

These and other objects and advantages of the invention which will be obvious from the following description are accomplished by incorporating a minor amount of a trialkyl phosphite into monomeric chloroprene. Any trialkyl phosphite in which the alkyl groups contain from 1 to 6 carbon atoms can be employed. Particularly useful is triethyl phosphite but trimethyl, tributyl, tripropyl, etc., phosphites can also be employed.

Only very small amounts of the inhibitors of the invention are required for effective inhibition of polymerization even at very high temperatures. In general, amounts of inhibitor from about 0.5% by weight to about 20% by weight of chloroprene are employed depending upon the temperature. At less extreme temperatures, the amount of inhibitor employed can be maintained at a level between about 0.5 and 5% for effective inhibition of polymerization.

The following example is presented to illustrate the invention but is not to be construed as limiting it in any manner whatsoever.

*Example 1*

A series of tests were carried out in which a number of polymerization bombs consisting of ½-in. steel pipe nipples fitted with closure caps were filled with a solution of 11.2% by weight of chloroprene in 1,2-dichloroethane. Precautions were taken to exclude oxygen during the filling operation by using an argon purge. Various compounds known to be useful as polymerization inhibitors and triethyl phosphite were added to the different bombs in a concentration of about 2% by weight of the solution charged (18% by weight of chloroprene present). One sample with no additive was employed as a control blank. The bombs were sealed and simultaneously placed in an oil bath maintained at a temperature of 160° C. for a predetermined length of time. At the end of the test period, the bombs were removed from the bath, cooled, and their contents emptied into small flasks. Qualitative results obtained by visual examination as compared against the blank are summarized below:

| Compound added | Exposure Time | |
|---|---|---|
| | 10 min. | 1 hr. |
| None | Polymerized | Polymerized. |
| Triethyl Phosphite | No Polymer | No Polymer. |
| tert-Butyl Catechol | Polymerized | |
| Sulfur | do | |
| Hydroquinone | | Polymerized. |
| Ditertiary Butyl Disulfide | Very Little Polymer | Do. |
| Urea | Little Polymer | Do. |
| s-Diphenyl Urea | Polymerized | |
| Piperidine | do | |

These results clearly show that chloroprene is stabilized against polymerization by triethyl phosphite even under the very drastic test conditions employed whereas other conventional polymerization inhibitors fail to inhibit polymerization of chloroprene under these conditions.

What is claimed is:
1. A composition of matter comprising chloroprene and as a polymerization inhibitor therefor from about 0.5% to about 20% by weight of said chloroprene of triethyl phosphite.
2. A process for inhibiting the polymerization of chloroprene which comprises incorporating therewith from about 0.5% by weight to about 20% by weight of said chloroprene of triethyl phosphite.

No references cited.